United States Patent [19]

Collins, Jr.

[11] Patent Number: 4,898,631

[45] Date of Patent: Feb. 6, 1990

[54] METHOD FOR FABRICATING CERAMIC FILAMENTS AND HIGH DENSITY TAPE CASTING METHOD

[75] Inventor: Earl R. Collins, Jr., La Canada, Calif.

[73] Assignee: California Institute of Technology, Pasadena, Calif.

[21] Appl. No.: 144,407

[22] Filed: Jan. 15, 1988

[51] Int. Cl.$^4$ .............................. B28B 1/20; B29B 9/06

[52] U.S. Cl. ........................................ 156/89; 156/167; 156/181; 156/242; 156/243; 156/244.11; 156/244.24; 156/245; 156/246; 156/250; 264/60; 264/63; 264/67; 264/114; 264/118; 264/121; 264/125; 264/311; 429/45

[58] Field of Search ................. 156/89, 181, 167, 242, 156/243, 245, 246, 244.11, 244.24, 250; 264/60, 63, 67, 114, 118, 121, 125, 311; 429/40, 45, 247; 425/75, 73, 425, 435

[56] References Cited

U.S. PATENT DOCUMENTS

| | | | |
|---|---|---|---|
| 1,956,607 | 5/1934 | Wyatt et al. | 156/89 |
| 2,582,993 | 1/1952 | Howatt | 156/89 |
| 3,012,086 | 7/1957 | Vahldieck . | |
| 3,143,440 | 8/1964 | Hunger et al. | 429/30 |
| 3,441,390 | 4/1969 | Backe et al. . | |
| 3,460,991 | 8/1969 | White . | |
| 3,703,413 | 11/1972 | Arrance . | |
| 3,793,084 | 2/1974 | Marchetto | 429/40 |
| 4,007,059 | 2/1977 | Witherspoon et al. | 429/40 |
| 4,064,207 | 12/1977 | DeCrescente et al. . | |
| 4,091,176 | 5/1978 | Alfenaar | 429/40 |
| 4,100,331 | 7/1978 | Ingham et al. | 429/40 |
| 4,175,153 | 11/1979 | Dobo et al. | 429/40 |
| 4,395,468 | 7/1983 | Isenberg | 429/31 |
| 4,431,715 | 2/1984 | Isenberg | 429/30 |
| 4,459,341 | 7/1984 | Marchant et al. | 429/33 |
| 4,462,891 | 7/1984 | Lawless | 204/427 |
| 4,490,444 | 12/1984 | Isenberg | 429/31 |
| 4,506,028 | 3/1985 | Fukuda et al. | 429/40 |
| 4,520,082 | 5/1985 | Makiel | 429/31 |
| 4,554,225 | 11/1985 | Sounai et al. | 429/34 |
| 4,587,068 | 5/1986 | Borase et al. | 264/63 |
| 4,598,028 | 7/1986 | Rossing et al. | 429/30 |
| 4,615,717 | 10/1986 | Neubauer et al. | 156/181 |
| 4,740,287 | 4/1988 | Cawfield | 204/284 |
| 4,783,231 | 11/1988 | Raley | 156/181 |

FOREIGN PATENT DOCUMENTS 57-60670 4/1982 Japan .
58-166639 10/1983 Japan .

OTHER PUBLICATIONS

Schutz, Master Thesis, Title: A Preliminary Investigation of Radiation Catalysis in Fuel Cells, Aug., 1979, Virginia Polytechnic Institute and State University, Blacksburg, Va., pp. 56 to 66 only.

*Primary Examiner*—Caleb Weston
*Attorney, Agent, or Firm*—F. Eugene Logan

[57] ABSTRACT

An apparatus and method is disclosed for fabricating mats of ceramic material comprising preparing a slurry of ceramic particles in a binder/solvent, charging the slurry into a vessel, forcing the slurry from the vessel into spinneret nozzles, discharging the slurry from the nozzles into the path of airjets to enhance the sinuous character of the slurry exudate and to dry it, collecting the filaments on a moving belt so that the filaments overlap each other thereby forming a mat, curing the binder therein, compressing and sintering the mat to form a sintered mat, and crushing the sintered mat to produce filament shaped fragments.

A process is also disclosed for producing a tape of densely packed, bonded ceramic particles comprising forming a slurry of ceramic particles and a binder/solvent, applying the slurry to a rotating internal molding surface, applying a large centrifugal force to the slurry to compress it and force excess binder/solvent from the particles, evaporating solvent and curing the binder thereby forming layers of bonded ceramic particles and cured binder, and separating the binder layer from the layer of particles.

Multilayers of ceramic particles are cast in an analogous manner on top of previously formed layers. When all of the desired layers have been cast the tape is fired to produce a sintered tape.

For example, a three-layer tape is produced having outer layers of highly compressed filament shaped fragments of strontium doped lanthanum ("LSM") particles and a center layer of yttria stabilized zicronia ("YSZ") particles.

21 Claims, 3 Drawing Sheets

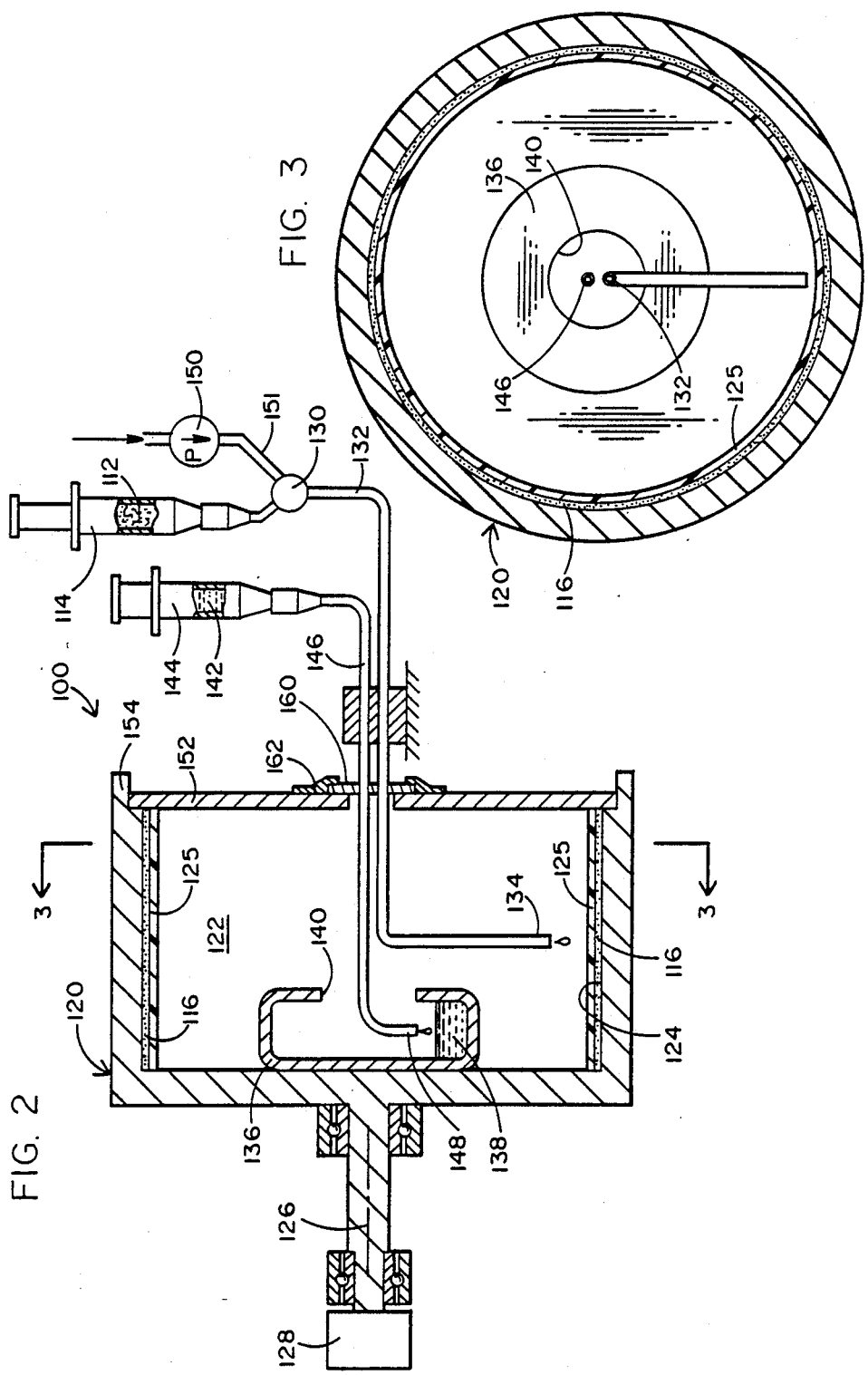

METHOD FOR FABRICATING CERAMIC FILAMENTS AND HIGH DENSITY TAPE CASTING METHOD

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

This invention is related to my copending Ser. No. 921,574, filed Oct. 21, 1986, now U.S. Pat. No. 4,839,121, entitled improved High Density Tape Casting System which is hereby incorporated herein by reference.

In the process for the electrolytic separation of oxygen from air, using solid electrolyte membranes such as zirconia, porous electrodes are needed. At present, ceramic electrode material is supplied as a fine powder and it is highly desirable to increase the particle size to increase the porosity of the electrode. However, as the particle size increases, contact area between particles decreases thereby increasing the electrode electrical resistance, an undesireable occurance. An improved porous electrode configuration is therefore needed having interconnecting pores and large contact area between the particles of the electrode material. Such improved porous electrodes can then be used in thin ceramic membrane, commonly called tapes.

Thin ceramic membranes or tapes are typically made from ground ceramic suspended in a mixture of solvents, binders, and other components, to form a slurry which is spread on a flat surface and allowed to cure by air-drying. The flexible, pliable tape is then fired in a kiln to remove solvents and other impurities, and results in a hard ceramic substrate for use in capacitors. Tapes are also formed in multilayer ceramic sandwiches comprising electrodes and insulators for separation of oxygen from air, and for use as the membrane of high temperature solid electrolyte fuel cells and high temperature solid electrolyte electrolysis cells and the like, hereinafter referred to collectively as "tape-containing devices".

Strontium doped lanthanum magnaite, which for brevity is sometimes referred to herein as "LSM", is known to be a good material for use in electrodes produced by tape casting methods. LSM having the mole ratio $La_{0.8}Sr_{0.2}MnO_3$ is available as a submicron size material having a surface area of 3 to 5 m$^2$/g from HUA Associates, Rolla, Mo.

Eight mole percent yttria stabilized zirconia, which for brevity is sometimes referred to herein as "YSZ", is known to be a good material for use in the electrolyte layer in such tape-containing devices.

SUMMARY OF THE INVENTION

There is provided by the principles of this invention a method of forming a mat of overlying sinuous filaments having a predetermined thickness comprising blending a mixture comprising finely divided solid particles a binder operable for bonding the solid particles together,f and a solvent for the binder, into an uniformly dispersed slurry; trfansforming the slurry into a plurality of downwardly falaments; deflecting the plurality of downwardly falling filaments with a plurality of impinging gas streams operative for deflecting and bending the filaments into a plurality of downwardly falling sinuous filaments while simultaneously removing the solvent therefrom by evaporation; and collecting the plurality of sinuous filaments on a moving surface in such a manner that the plurality of sinuous filaments overlap each other in a predetermined amount thereby forming a mat of overlying sinuous filaments having a predetermined thickness. In another embodiment of this invention the method further comprises compressing the thusly produced mat to increase the filament-to-filament contact therein thereby producing a pressed mat; heating the pressed mat to a temperature operable for increasing the amount of filament-to-filament bonding therein thereby producing abonded mat; and comminuting the bonded mat thereby producing filament shaped fragments of bonded agglomerates of the solid particles. In yet a further embodiment the produced filament shaped fragments are ceramic.

There is also provided by the principles of this invention a method of producing filament shaped fragments of bonded agfgomerates of strontium lanthanua manganite particles comprising blending a mixture comprising finely divided solid particles of strontium lanthanus manganite, a binder operable for bonding the solid particles together, and a solvent for the binder, into an uniformly dispersed slurry; transforming the slurry into a plurality of downwardly falling filaments; deflecting and drying the plurality of downwardly falling filaments with a plurality of impinging gas streams operative for deflecting and bending the filaments into a plurality of downwardly falling sinuous filaments while simultaneously removing the solvent therefrom by evaporation; collecting the plurality of sinuous filaments on a moving surface in such a manner that the plurality of sinuous filaments overlap each other in a predetermined amount thereby forming a mat of overlying sinuous filaments having a predetermined thickness; compressing the mat to increase the filament-to-filament contact therein thereby producing a pressed mat; sintering the pressed mat at a temperature operable for increasing the amount of filament-to-filament bonding therein thereby providing a bonded mat; and comminuting the bonded mat thereby producing filament shaped fragments of bonded agglomerates of strontium lanthanum manganite particles. In a further embodiment the binder is polyvinyl butyral and the solvent is methylene chloride. In another embodiment the filament shaped fragments have an average length of at least about 0.003 inches and a width of at least about 0.00025 inches.

There is also provided by the principles of this invention a method of producing a tape of densely packed, bonded solid particles comprising blending a mixture comprising finely divided solid particles, a binder operable upon curing for bonding the finely divided solid particles together, and a solvent for the binder, into an uniformly dispersed slurry; introducing the thusly blended uniformly dispersed slurry onto a rotating internal molding surface; and applying an effective centrifugal force to the slurry thusly introduced onto the rotating internal molding surface which is operable for transforming the slurry into an outer, densely packed, annular layer of the solid particles coated with a small amount of the solvent andd the binder which is compressed against the molding surface by the centrifugal force and an inner annular layer of the solvent and the binder which is compressed against the outer, densely packed, annular layer of the solid particles by the centrifugal force, the amount of binder used for forming the uniformly dispersed slurry being in excess of an amount required to bond the solid particles together. After forming the outer and inner annular layers and while applying the centrifugal force, the method further comprises removing the solvent from the outer and inner annular layers by evaporation; allowing the binder coating the solid particles in the outer annular layer to bond the solid particles together thereby forming an outer, densely packed, bonded, annular layer of the solid particles, and allowing the binder int he inner annular layer to cure into a solid state thereby forming an inner annular layer of cured binder; removing the applied centrifugal force from the outer and inner annular layer and thereafter separating the inner annular layer of cured binder from the outer, densely packed, bonded, annular layer of the solid particles; and separating the outer densely packed, bonded, annular layer of the solid particles from the molding surface thereby producing a tape of densely packed, bonded solid particles. In one embodiment the finely divided solid particles used to produce the tape of densely packed, bonded solid particles are strontium lanthanus manganite particles. In one embodiment the binder is polyvinyl butyral and the solvent is methylene chloride. In one embodiment the effective centrifugal force is at least about 1800 g and preferably at least about 2000 g. In another embodiment the method further comprises sintering the thusly produced tape of sensely packed, bonded solid particles to produce a tape of sensely packed, sintered solid particles.

There is also provided byd the principles of this invention a method of producing a multilayer tape of sensely packed, bonded solid particles comprising:

(a) blending a first mixture comprising finely divided first solid particles having a chemical composition, a first binder operable upon curing for bonding the finely divided first solid particles together, and a first solvent for the first binder, into an uniformly dispersed first slurry;

(b) introducing the thusly blended uniformly dispersed first slurry onto a rotating internal molding surface;

(c) applying an effective centrifugal force to the first slurry thusly introduced onto the rotating internal molding surface which is operable for transforming the first slurry into an outer, densely packed, annular layer of the first solid particles coasted with a small amount of the first solvent and the first binder which is compressed against the molding surface by the centrifugal force, and an inner annular layer of the first solvent and the first binder which is compressed against the outer, densely packed, annular layer of the first solid particles by the centrifugal force, the amount of the first binder used for formfing the uniformly dispersed first slurry in step (a) being in exvcess of an amount required to bond the first solid particles together;

(d) after forming the outer and inner layers and while applying the centrifugal force, removing the first solvent from the outer and inner annular layers by evaporation;

(e) allowing the first binder coating the first solid particles in the outer, densely packed, annular layer to bond the first solid particles together thereby forming an outer densely packed, bonded, annular layer of the first solid particles, and allowing the first binder in the inner annular layer to cure into a solid state thereby forming an inner annular layer of cured first binder;

(f) removing the applied centrifugal force from the outer and inner annular layers and thereafter separating the inner annular layer of cured first binder from the outer, densely packed, bonded annular layer of the first solid particles;

(g) blending a second mixture comprising finely divided second solid particles having a chemical composition which is the same or different from the chemical composition of the first solid particles, a second binder operable upon curing for bonding the finely divided second solid particles together, and a second solvent for the second binder, into an uniformly dispersed second slurry, the second binder and the second solvent not being capable of chemically attacking the first binder int he thusly produced outer, densely packed, bonded, annular layer of the first solid particles;

(h) rotating the internal molding surface containing the outer, densely packed, bonded, annular layer of the first solid particles;

(i) introducing the thusly blended uniformly dispersed second slurry onto the rotating outer, densely packed, bonded, annular layer of the first solid particles;

(j) applying an effective centrifugal force to the second slurry thusly introduced onto the rotating outer, densely packed, bonded, annular layer of the first solid particles which is operable for transforming the second slurry into a second, densely packed, annular layer of the second solid particles coated with a small amount of the second solvent and the second binder which is compressed against the outer, densely packed, bonded, annular layer of the first solid particles by the last mentioned centrifugal force, and an inner annular layer of the second solvent and the second binder which is compressed against the second, densely packed, annular layer of the second solid particles by the last mentioned centrifugal force, the amount of the second binder used for forming the uniformly dispersed second slurry in step (g) being in excess of an amount required to bond the second solid particles together;

(d) after forming the second, densely packed, annular layer of the second solid particles and the inner annular layer of the second solvent and the second binder, removing the second solvent therefrom by evaporation; and (l) allowing the second binder coating the second solid particles int he second, densely packed, annular layer of the second solid particles to bond the second solid particles thereof together thereby forming a second, densely packed, bonded, annular layer of the second solid particles, and allowing the second binder in the last mentioned inner annular layer to cure into a solid state thereby forming an inner annular layer of cured second binder.

In one embodiment the method of this invention further comprises after step (l) removing the last mentioned applied centrifugal force from the annular layers and thereafter separating the inner annular layer of cured second binder from the second, densely packed, bonded, annular layer of the second solid particles thereby forming a composite layer structure which comprises the outer,f densely packed, bonded, annular layer of the first solid particles and bonded thereto the second, densely packed, bonded annular layer of the second solid particles; and separating the composite layer structure from the internal moldiang surface thereby producing a multilayer tape of densely packed, bonded solid particles. In yet another embodiment the chemical composition of the finely divided first saolid particles is strontium lanthanum manganite, and the chemical composition of the finely divided second solid particles is yttria stabilized zirconia.

In one emobidment the method of this invention further comprises after step (l) removing the last mentioned applied centrifugal force from the annular layers and thereafter separating the inner annular layer of cured second binder from the second, densely packed, bonded, annular layer of the second solid particles; blending a third mixture comprising finely divided third solid particles having a chemical composition which is the same or different from the chemical composition of the second solid particles, a third binder operable for bondifng the finely divided third solid particles together, and a third solvent for the third binder, into an uniformly dispersed third slurry, the third binder and the third solvent not being capable of chemically attacking the second binder int he thusly formed second, densely packed, bonded, annular layer of the second solid particles; rotating the internal molding surface containing the outer, densely packed, bonded annular layer of the first solid particles and the second, densely packed, bonded, annular layer of the second solid particles; introducing the thusly blended uniformly dispersed third slurry onto the rotating second, densely packed, bonded, annular layer of the second solid particles; applying an effective centrifugal force to the second slurry thusly introduced onto the rotating second, densely packed, bonded, annular layer of the second solid particles which is operable for transforming the third slurry into a third, densely packed, annular layer of the third solid particles coated with a small amount of the third solvent and the third binder which is compressed against the second, densely packed, bonded, annular layer of the second solid particles by the last mentioned centrifugal force, and an inner annular layer of the third solvent and the third binder which is compressed against the third, densely packed, annular layer of the third solid particles by the last mentioned centrifugal force, the amount of the third binder used for forming the uniformly dispersed third slurry being in excess of an amount required to bond the third solid particles together; after forming the third, densely packed, annular layer of the third solid particles and the inner annular layer of the third solvent and the third binder, removing the third solvent therefrom by evaporation; allowing the third binder coating the third solid particles in the third, densely packed, annular layer of the third solid particles to bond the third solid particles thereof together thereby forming a third, densely packed, bonded, annular layer of the third solid particles, and allowing the third binder in the last mentioned inner annular layer to cure into a solid state thereby forming an inner annular layer of cured third binder; removing the last mentioned applied centrifugal force from the annular layers and thereafter separating the inner annular layer of cured third binder from the third, densely packed, bonded, annular laye of the third solid particles thereby forming a composite layer structure which comprises the outer, densely packed, bonded, annular layer, of the first solid particles which is bonded to the second, densely packed, bonded, annular layer of the second solid particles, which is bonded to the third, densely packed, bonded, annular layer of the third solid particles; and separating the composite layer structure from the internal molding surface thereby producing a multilayer tape of densely packed, bondfedf solid particles. In one embodiment the chemical composition of the finely divided first and third solid particles is strontium lanthanum manganite, and the chemical composition of the finely divided second solid particles is yttria stabilized zirconia. In another emobodiment the first and third binder is polyvinyl butyral, the second binder is linseed oil, the first and third solvent is methylene chloride, and the second solvent is petroleum spirits.

There is also provided by the principles of this invention an apparatus for forming a mat of overlying sinuous filaments which comprise solid particles, the apparatus comprising a manifold; means in fluid communication with the manifold for feeding a viscous slurry which comprises finely divided solid particles, a binder operable for bonding the solid particles together, and a solvent for the binder, into the manifold; a plurality of orifices in fluid communication with the manifold, each of the orifices having a downwardly facing outlet operable for producing, when the apparatus is in use, a downwardly directed fluid filament of such viscous slurry, the plurality of orifices being positioned in a predetermined spatial arrangement with respect to each other; a plurality of nozzles operable, when connected to a gas source, for impinging a plurality of gas streams, when the apparatus is in use, upon such fluid filaments, the plurality of nozzles being positioned in a predetermined spatial orientation with respect to each other and the outlets of the plurality of orifices, the plurality of nozzles being operable for deflecting and bending such fluid filaments into downwardly falling sinuous filaments while simultaneously removing solvent therefrom by evaporation; means having a continuous moving surface for collecting, when the apparatus is in use, such downwardly falling sinuous filaments, the moving surface operable for moving in a predetermined direction, the predetermined spatial arrangement of the plurality of orifices being positioned at spaced intervals along the predetermined direction and over the moving surface such that such downwardly falling sinuous filaments will fall overtop of any such filaments already on the moving surface, the apparatus thereby being operable for forming a mat of overlying sinuous filaments which comprise solid particles; and means for removing, when the apparatus is in use, such mat of overlying sinuous filaments from the immediate preceding mentioned menas. In one embodiment the means in fluid communication with the manifold for feeding a viscous slurry comprises a storage tank divided into a first zone and a second zone by a diaphragm, a first conduit with a first value in fluid communication with the first zone, a second conduit with a second valve in fluid communication with the second zone and the manifold, a third conduit with a third value in fluid communication with the second conduit at a point between the second valve and the manifold, a fourth conduit with a fourth valve in fluid communication with the second conduit at a point between the second zone and the second valve; and wherein each of the orifices is a spinneret nozzle which is operable for extruding a filament in a spiral. In another emodiment each of the orifices comprises an upstanding funnel shaped member having a relatively large inlet in fluid communication with the manifold and a relatively small outlet formed in sapphire which is the downwardly facing outlet of the orifice.

Accordingly, this invention is an apparatus and method for fabricating ceramic mats comprised of sinuous filaments of ceramic material. The method involves forming a slurry comprised of fine ceramic particles suspended in a liquid vehicle containing a binder and a solvent, introducing the thusly formed slurry into one zone of a vessel having two zones separated by a disphragm. Pressurizing the other zone of the vessel thereby displacing the diaphragm into the first zone containing the slurry and forcing the slurry through a series of fine spinneret nozzles into the path of alternately-pulsed airjets, thereby deflecting the slurry exudates rapidly back and forth and thereby forming partially dried sinuous filaments which are accumulated onto a moving surfacing in such a manner that the sinuous filaments ovrlap and form a mat. In a further embodiment the mat is pressed to increase filament-to-filament contact, then heated to form a bonded mat and then comminuted to produce filament shaped fragments of bonded agglomerates of the solid ceramic particles. These bonded aggomerate fragments have high porosity and relative low electrical resistance and can be used as the ceramic material in formulating a slurry for tape casting.

It has been discovered that if an excess of binder and solvent are used in formulating the slurry for tape casting and if the apparatus described in my earlier filed application referred to above is used for forming the tapes under high centrifugal force, then the ceramic particles are tightly compressed and virtually all of the excess binder/solvent is forced to the surface of the mixture. After curing, this excess binder/solvent forms a solidified film that is easily peeled off, leaving a dense layer of tightly packed ceramic particles on the casting surface of the apparatus. Multilayered tapes can be casted in a similar manner under centrifugal force and after curing the excess binder is peeled from each layer of the casting before the next layer is cast.

Therefore one embodiment of this invention is a method of high density centrifugal tape casting operable for casting a multilayer tape, using a centrifugal tape casting machine capable of attaining centrifugal forces in the vicinity of at least about 1800 g and preferably at least about 2000 g and higher, wherein the cast particles are so tightly compressed that excess binder/solvent is forced to the surface by the centrifugal force and, after curing, can be peeled off, and further wherein additional ceramic layers can then be cast on top of the previously formed ceramic layer using mutually insoluble binder/solvent or non-deleteriously reacting casting vehicles for each abutting layer of ceramic materials. In fact the binder/solvent is almost totally squeezed out of the compacted layer of solid particles with only enough binder/solvent remaining that after removal of the solvent and curing of the binder to effect a high strength bonding of the particles together. In general with adhesive bonds the thinner the adhesive layer bonding surfaces together the stronger the bond. Peeling of the cured binder layer from the particle layer does not alter the strong particle to particle bond.

The tape casting method of this invention using centrifugal force to form densely packed ceramic layers and separation of excess binder/solvent produces a superior tape than the existing present methods of making such multilayer sandwich construction tapes which do not produce the uniform, high density, high strength, single layer or multilayer tapes produced by the centrifugal tape casting method of this invention wherein excess binder or binder/solvent from each layer is removed after curing.

BRIEF DESCRIPTION OF THE DRAWINGS

FIG. 2 is an apparatus useful for conducting my method of forming a high density single layer or multilayer tapes.

FIG. 3 is a view taken along line 1—3 of FIG. 2.

DESCRIPTION OF THE PREFERRED EMBODIMENTS

A slurry is formed from commercially available LSM power and a suitable binder/solvent system. The particular binder/solvent system used is not impo/rtant and any state of art binder/solvent system can be used to form the LSM slurry as long as the binder when cured is operable for bonding the LSM particles together. In one embodiment a polyvinyl butyral system is used as the binder/solvent for the LSM powder. However, other binder/solvent systems can be used including non-organic aqueous binder/solvent systems. Furthermore this invention is useful for other ceramic powders and is not limited to merely LSM powders.

Figure 1:
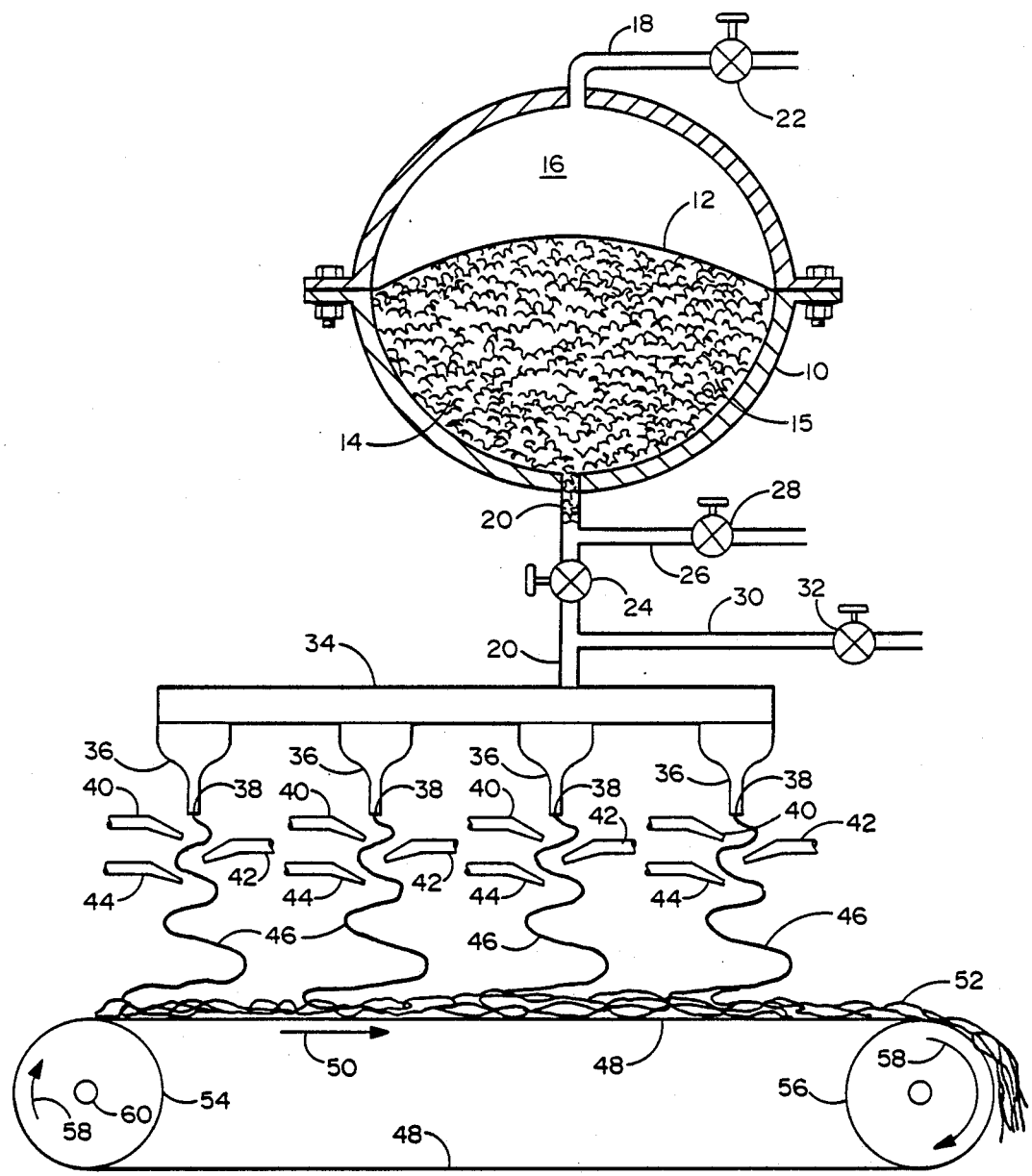
FIG. 1 is a schematic of my apparatus for forming and collecting overlapping sinuous filaments on a moving surface.

FIG. 1 is a schematic of my apparatus useful for producing a mat of overlying sinuous filaments having a predetermined thickness.

Air tight vessel 10 contains internal diaphragm 12 which defines a lower zone 14 and an upper zone 16 in the vessle. In communication with the vessel are conduits 18 and 20 which contain valves 22 and 24, respectively. In communication with conduit 20 betweenf the vessel and valve 24 is conduit 26 which contains valve 28. Also in communication with conduit 20 an d after valve 24 are conduit 30 which contains valve 32 and manifold 34 which is communication with a plurality of spinneret nozzles 36. Preferably the outlet of each of nozzles 36 contains a small outlet 38 formed in sapphire through which a solid-containing sinuous filament can be extruded as will be further explained. A plurality of air jet nozzles 40, 42 and 44 are positioned in a predetermined spatial orientation with respect to each other and below outlets 38. The jet nozzles are operable for impinging pulsating jets of air downwardly on the extruded sinuous filaments to enhance the sinuous shape of the falling filaments, to assist in pushing the filaments downward, and to dry the filaments.

To use the apparatus lower zone 14 in vessel 10 is at least partially evacuated by pulling a vacuum on conduit 26 with valve 28 being opened and valves 24 and 32 closed. Elastic diaphragm 12 is pulled downward against the lower inside wall of vessel 10 by the vacuum pulled through conduit 26. After evacuation of zone 14, conduit 26 is connected to a source (not shown) of degassed slurry containing for example an uniformly dispersed LSM powder in a binder/solvent system, and valve 28 is opened thereby allowing slurry to enter zone 14 through conduits 26 and 20 either by the pull of the partial vacuum and/or by pumping the slurry into the vessel from its source thereby charging zone 14 with slurry 15. As slurry 15 flows into vessel 10, diaphragm 12 is displaced upwards. When a sufficient amount of slurry is introduced into the vessel valve 28 is closed.

Conduit 30 is connected to a sourace of solvent (not shown) and valve 32 is opened while valve 24 remains closed and solvent is pumped through conduits 30 and 20 into the manifold and nozzles 36 and discharged through outlets 38 thereby flushing and cleaning out the apparatus of any residue that might be left over from its last use and displacing air from inside the manifold and spinneret nozzles with solvent vapors. Thereafter valve 32 is closed and pressurized gas from a source (not shown) is connected to conduit 18 and valve 22 opened thereby pressurizing upper zone 16 in vessel 10.

Pressurized gas in upper zone 16 exerts a downward force on diaphragm 12. When valve 24 is opened, the slurry in zone 16 is forced through conduit 20 by the gas pressure in zone 16 into manifold 34, spinneret nozzles 36 and discharged as downwardly falling sinuous filaments or threads 46 from outlets 38.

Filaments 46 are collected on conveyer belt 48 which moves in the direction of arrow 50 at a predetermined rate designed to permit filaments 46 to overlay each other thereby forming mat 52 having a predetermined thickness related to and controlled by the speed at which belt 48 is made to run. Belt 48 runs on pulleys 54 and 56 which rotate in direction shown by arrows 58. Shaft 60 of pulley 54 is driven by a conventional variable speed motor (not shown).

After the desired amount of filament mat is formed, valves 22 and 24 are closed and valve 32 is opened and solvent is pumped through conduit 30 to flush out the manifold, spinneret nozzles and outlets 38.

Preferably each spinneret nozzle is shaped like an enclosed funnel leading to a sapphire orifice which in installed in the lower end of the nozzle. The sapphire orifice has been drilled to the desired filament diameter. The hard surface of the sapphire prevents rapid errosion of the outlet by the metal oxide particles of the slurry as the slurry is extruded.

It is, however, important to note that air can dry the surface of the slurry causing a thickened "skin" to form which could clog the fine spinneret nozzles and sapphire orifices. Therefore by evacuating the lower zone in vessel 10 before the slurry is introduced into the vessel and by purging the manifold, nozzles and outlets 38 with solvent or a binder/solvent mixture just before the apparatus is to be used, air is removed from the apparatus thereby preventing a thickened skin from forming in the slurry prior to its discharge from outlets 38.

The array of alternately pulsating airjets from nozzles 40, 42 and 44 commence the drying of the sinuous filaments formed from the slurry and enhance the sinuous character of the filaments thereby forming randomly three-dimensionally-deployed threads which enables a mat of randomly twisted overlayed filaments to be collected and formed on belt 48.

By the time the mat reaches the location of pulley 56, it is sufficiently dry that it will fall from the belt as the belt travels around pulley 56. the loosely-piled mat is then carried away by another conveyor of conventional design (not shown) for further processing.

The loosely-piled mat is then compressed to improve filament-to-filament contact and sintered to produce a bonded mat. The bonded mat is then lightly crushed to produce filament shaped fragments of bonded agglomerates of the solid metal oxide or ceramic particles, for example filament shaped fragments of LSM having a diameter of about 0.00025 inches and average length of about 0.003 inches. Other diameters and lengths of filament shaped fragments can be produced if desired including mixtures to produce a predetermined size distribution. For example in an alternative embodiment of this invention, the diameters of orifices 38 are not all the same so that a predetermined mix of filament diameters are produced.

The thusly produced filament shaped fragments of bonded agglomerates of metal oxide or ceramic particles can be used to produce a ceramic tape in all types of tape casting machines. However, another embodiment of this invention uses the filament shaped fragments to produce a high density tape in the apparatus shown in FIGS. 2 and 3 which is more fully explained in my copending application previously identified.

The high density tape casting system 100 shown in FIGS. 2 and 3 comprises chamber 120 having large cylindrical internal molding surface 124 mounted for rapid rotation about axis 126 for developing high centrifugal forces. Conduit 132 extending into chamber 122 is used for applying slurry to the molding surface through outlet 134 as it rapidly rotates. the chamber is substantially closed to avoid the rapid evaporation and loss of solvent as the slurry is applied and as the slurry is evely distribuited on the molding surface, and as the particles are compressed against the molding surface by the applied centrifugal force. A means is provided for venting the chamber to remove the solvent by evaporation and to allow the binder to bond the filament shaped fragments or particles together, while the chamber continues to rotate as will be explained.

Means 144 is provided for filling the chamber with solvent vapors prior to the application of the slurry to the molding surface. This further assures that the slurry will remain highly fluid until it is well distributed on the molding surface and venting of solvent begins. The vapors can be provided by solvent-holding container 136 which is open at 140 to the chamber environment.

FIGS. 2 and 3 therefore illustrate a tape casting system 100 which can mold a slurry 112 received from feeding means 114 into a tape. The system includes a rotor or housing 120 which forms a chamber 122 having an internal largely cylindrical molding surface 124. The housing 120 is rotatably mounted about an axis 126 which is also the axis of cylindrical molding surface 124. A motor 128 rotates the housing to create high centrifugal forces urging slurry in the chamber against the molding surface 124.

In the particular apparatus shown in FIG. 2, a non-rotatable sealed plate 160 is rotatably mounted on rotatable seals 162 attached to the housing. A variety of constructions can be used, and a variety of methods can be used to initially seal the housing and then purge it with of solvent vapors. In any case, the walls of the chamber 122 are constructed to form a substantially closed container so as to hold in the solvent vapors, and a means is provided to vent the chamber to remove solvent vapors while the molding surface continues to rotate.

During casting or molding of the tape 116, slurry containing an excess of binder an solvent from the source 114 passes through a valve 130 and through a stationary conduit 132 to a nozzle 134 which sprays or otherwise evenly applies the slurry over molding surface 124. During such application of slurry, housing 120 is rotated rapidly to create high centrifugal forces thereby compressing the slurry against the moldong surface. The higher density particles in the slurry are compressed with greater force against molding surface 124 than the binder/solvent thereby producing a very high compacted density of particles in the cast tape and forcing the excess binder and solvent out of and abutted against the layer of densely packed ceramic particles thereby forming, after curing, inner layer 125 of cured binder adjacent to compacted solid particle layer 116.

The slurry 112 includes ceramic particles, or preferably filament shaped fragments of agglomerates thereof, a binder in excess of the amount necessary to bind the particles together, and a solvent for the binder in an amount effective for despersing the ceramic particles in the slurry uniformly over the molding surface. the solvent also has sufficiently high vapor pressure that it can be removed by evaporation.

If the chamber 122 initially contained only air, and the slurry 112 were then cast onto the molding surface 124, there would likely be an uneven distribution of th eslurry thereby preventing formation of a tape of uniform thickness. This is because the solvent might rapidly evaporate from the slurry before the slurry has a chance to become evenly distributed on the molding surface. Evaporation of the solvent in the slurry is prevented by providing extra solvent 138 in container 136 with outlet 140 open to the inside of the chamber. Prior to introducing the slurry onto the molding surface, solvent is introduced into container 136 to saturate the atmosphere inside the atmosphere inside the chamber with solvent vapors thereby preventing premature drying of the slurry. This is accomplished by flowing solvent 142 from source 144 through stationary conduit 146 to nozzle 148 which forms solvent supply 138 in container 136. Solvent supply 138 can be replenished from time to time as it is depleted by means 144.

After housing 120 has been rotated to a predetermined rpm, the slurry from source 114 is introduced onto the molding surface. After a few seconds the slurry is evenly distributed over the molding surface and the particles begin to precepitate out of the slurry and compact against the molding surface thereby forming a relatively dense and compact outer annular layer of solid particles and adjacent thereto an inner annular layer of excess binder/solvent.

with the housing continuing to rotate, chamber 122 is vented to allow solvent to evaporate from the layers. Venting is accomplished by pumping air with pump 150 through the valve 130 which has been switched to allow air pumped through conduit 151 into the chamber through conduit 132. At the same time, source 144 is removed from conduit 146 to allow air and solvent vapors to escape from the chamber through conduit 146. If a large amount of solvent is used, it may be recaptured, burned, or otherwise neutralized. After removal of solvent an outer annular layer of particles and binder is formed adjacent the molding surface and an inner annular layer of excess binder is formed adjacent thereto. The binder in the two layers is allowed to cure thereby forming an outer annular layer of compacted and bonded particles and an inner annular layer of solid cured excess binder. The binder can be a room temperature curable type or an elevated temperature curable type which can be cured by heating housing 120. Regardless of the type of binder, chamber 120 is rotated while the binder cures in both layers.

Figure 4:
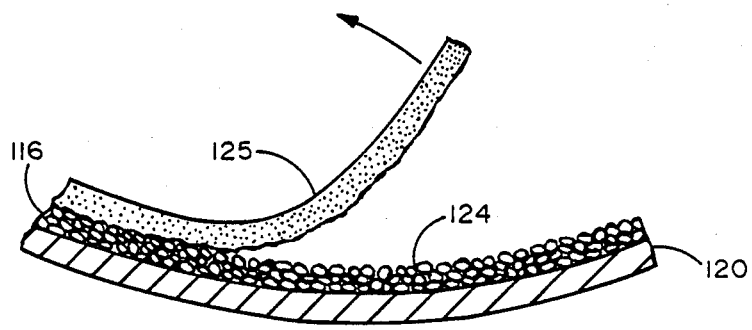
FIG. 4 is a cross-sectional view, greatly enlarged, of a cured high density single layer tape with the cured excess bindr layer being removed.

After the binder has cured plates 152, 160 and 162 are removed from housing member 154 and inner annular layer 125 of cured solid binder is peeled off of outer annular layer 116 of bonded solid particles in the manner shown in FIG. 4.

If only a single layer of bonded solid particles is required then layer 116 is removed from molding surface 124 and further processed to produce a sintered tape. However in one embodiment of this invention layer 116 is not removed from molding surface 124 and a second slurry of solid or ceramic particles is cast directly on top of layer 116 using its inner cylindrical surface as a molding surface for the second slurry in a process exactly analogous to the method used for forming the first layer of solid particles as will be explained.

Since the first layer has not at this point been sintered it still contains binder which can be chemically attacked by the solvent in the second slurry. For this reason it is important to select as a second binder/solvent system substances that will not have a deleterious effect on the first layer, i.e. layer 116. For example binder/solvents systems which will not dissolve the binder in the first layer should be used. For example if the first layer was formed from a LSM slurry using a polyvinyl butyral/methylene chloride binder/solvent system a second layer could be formed from a YSZ slurry using a linseed oil/petroleum spirits binder/solvent system which will not dissolve or deleteriously react with the cured binder of the LSM-containing first layer.

After the second slurry containing the second solid particles is applied to existing cured and bonded first layer of first solid particles and while chamber 120 is continuing to rotate, the second solid particles are tightly compressed against the first layer of solid particles thereby forming a second later of densely packed second solid particles with the excess binder/solvent of the second slurry being forced to the inner surface of the layer of densely packed second solid particles. Chamber 122 is then vented to remove solvent from the second layer in a manner similar to the venting of the first layer, i.e. by removing source 144 of second solvent from conduit 146, pumping air through conduits 151 and 132 into the chamber through conduit 146.

Figure 5:
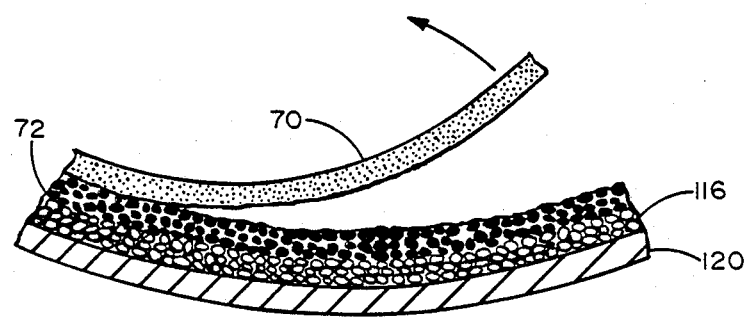
FIG. 5 is a cross-sectional view similar to FIG. 4 of a two layer tape with the cured excess binder of the second ceramic layer being removed.

After the solvent is evaporated from the second layer of solid particles the binder therein is allowed to cured thereby forming a bonded second layer of second solid particles and abutted thereto a solid annular layer of cured second binder. The centrifugal force is removed, the rotation of chamber 120 is stopped, plates 152, 160 and 162 are removed, and cured layer 70 of second binder peeled from second layer 72 of bonding densely packed second particles as shown in FIG. 5 thereby leaving a composite ceramic tape comprising layer 72 of second solid particles bonded to layer 116 of first solid particles.

If only a two layer structure is desired the composite tape can be removed from molding surface 124 and fired to produce a sintered two layer tape. If a three layer structure is desired and the outer layers are identical then the two layer tape can be folded over on itself, the foled composite structure pressed together and fired to produce a sintered three layer tape.

Figure 6:
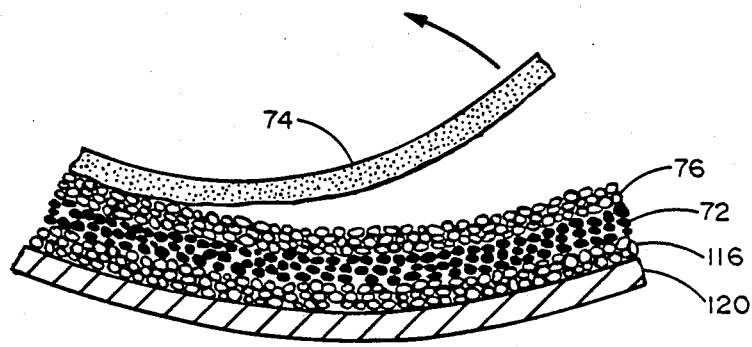
FIG. 6 is a cross-sectional view similar to FIG. 5 of a three layer tape with the cured excess binder of the third ceramic layer being removed.

In an alternative embodiment of this invention covrer 152 is reassembled, after removal of the layer of cured second binder, and a third slurry containing a third kind of solid particles and binder/solvent is added to slurry feeder 144. Chamer 122 is rotated, a third solvent is introduced with solvent feeder 114 and the third slurry is applied to the exposed inner surface of layer 72 in a manner analogous to the application of the first two slurries into the chamber. As in the formation of the first two layers the applied centrifugal force forms a thirds densely packed layer of solid particles with excess binder/solvent forming a fourth layer abutted thereto. Solvent is evaporated in an analogous manner as that described ealier and the binder in the third and fourth layers allowed to cure. After the binder has cured outer layer 74 of binder is peeled off of third later 76 of bonded cured densely packed third solid particles as shown in FIG. 6.

The composite tape structure comprising layers 116, 72 and 76 can be removed from molding surface 124 and fired to produce a three layer sintered ceramic. Alternatively additional layers of solid particles can be added in an analogous manner to form as many layers as desired.

Tape structures can be folded or lamanated to other green tape structures and fired to produce unlimited variety of multilayered ceramic tapes for various uses. However the binder/solvent system used for forming a particular layer of solid particles must be non-deleteriously reactive with the cured binder in the immediately preceding layer of solid particles in order to prevent alteration thereof. Therefore binder/solvent systems which will dissolve or penetrate into the cured binder of the previous layer should not be used. Binder/solvent systems which are immiscible with the binder used in the previous layer are therefore preferred. Binders which crosslink during curing usually are not deleteeriously attached by binder/solvents in the subsequently cast slurry and therefore are also preferred.

In casting a sandwich membrane tape for the electrolytic separation of oxygen from air, three layers are needed: a central layer of YSZ particles, between two layers of LSM particles. The latter serves as the conducting electrode layer. Thus, the layer deposited and first compacted in FIG. 4 would be an LSM layer.

FIG. 5, the second slurry would be YSZ slurry which has been poured in place, compressed against the LSM layer, cured, and is having its excess binder peeled away. As in all subsequently applied slurries, this second slurry should have its liquid components chosen so as not to deleteriously attack the cured binder of the first layer such as a solvent which cannot dissolve the first binder, or alternatively by use of a binder in the LSM layer which undergoes polymerization during cure.

FIG. 6 is a third layer has been cast and cured which in this example is a second LSM layer. Again, the liquid components of the LSM slurry are chosen not to dissolve the cured binder of the YSZ layer. Since only the previous layer is likely to be affected, the solvent/binder mixtures can be an alternating pair of mixtures, regardless of how many layers are cast.

To enhance ease of handling, and to provide easier removal from the molding surface or drum, a protective coating layer can be deposited on the drum before slurry casting, and then cured. Such a protective layer can also be applied after casting is complete, to completely cover the tape. With proper choice of components, the cast solids will not penetrate into this first coat, which will define a sharp interface between it and the first layer. Finally, the multilayer tape is removed from the casting drum, and kiln fired, in the usual manner. This removes all organics and impurities, leaving only the ceramics, sintered into a strong assembly. By control of the centrifugal forces, solvents, and binders involved, control may be had over density, interpenetration, and strength, in any desired combination of qualities.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in the figures and that varations in such minor details will be apparent to one skilled in the art.

Therefore it is be understood that the present disclosure and embodiment of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A method of forming a mat of overlying sinuous filaments having a predetermined thickness comprising:
   (a) blending a mixture comprising
      (i) finely divided solid particles,
      (ii) a binder operable for bonding said solid particles together, and
      (iii) a solvent for said binder, into an uniformly dispersed slurry;
   (b) transforming said slurry into a plurality of downwardly falling filaments;
   (c) deflecting said plurality of downwardly falling filaments with a plurality of impinging gas streams operative for deflecting and bending said filaments into a plurality of downwardly falling sinuous filaments while simultaneously removing said solvent therefrom by evaporation; and
   (d) collecting said plurality of sinuous filaments on a moving surface in such a manner that said plurality of sinuous filaments overlap each other a predetermined amount thereby forming a mat of overlying sinuous filaments having a predetermined thickness.

2. The method of claim 1, further comprising compressing said thusly produced mat to increase the filament-to-fileament contact therein thereby producing a pressed mat;
   heating said pressed mat to a temperature operable for increasing the amount of filament-to-filament bonding therein thereby producing a bonded mat; and
   comminuting said bonded mat thereby producing filament shaped fragments of bonded agglomerates of said solid particles.

3. The method of claim 2, wherein said produced filament shaped fragments are ceramic.

4. The method of claim 1, wherein said transforming of said slurry into a plurality of downwardly falling filaments includes extruding the slurry.

5. A method of producing filament shaped fragments of bonded agglomerates of strontium lanthanum manganite particles comprising:
   (a) blending a mixture comprising
      (i) finely divided solid particles of strontium lanthanum manganite,
      (ii) a binder operable for bonding said solid particles together, and (iii) a solvent for said binder, into an uniformly dispersed slurry;

(b) transforming said slurry into a plurality of downwardly falling filaments;

(c) deflecting and drying said plurality of downwardly falling filaments with a plurality of impinging gas streams operative for deflecting and bending said filaments into a plurality of downwardly falling sinuous filaments while simultaneously removing said solvent therefrom by evaporation;

(d) collecting said plurality of sinuous filaments on a moving surface in such a manner that said plurality of sinuous filaments overlap each other a predetermined amount thereby forming a mat of overlying sinuous filaments having a predetermine thickness;

(e) compressing said mat to increase the filament-to-filament contact therein thereby producing a pressed mat;

(f) sintering sand pressed mat at a temperature operable for increasing the amount of filament-to-filament bonding therein thereby providing a bonded mat; and (g) comminuting said bonded mat thereby producing filament shaped fragments of bonded agglomerates of strontium lanthanum manganite particles.

6. The method of claim 5, wherein said filament shaped fragments have a length of at least about 0.003 inches and a width of at least about 0.00025 inches.

7. The method of claim 5, wherein said binder is polyvinyl butyral and said solvent is methylene chloride.

8. The method of claim 5, wherein said transforming of said slurry into a plurality of downwardly falling filaments includes extruding the slurry.

9. A method of producing a tape of densely packed, bonded solid particles comprising:
(a) blencing a mixture comprising
(i) finely divided solid particles,
(ii) a binder operable upon curing for bonding said finely divided solid particles together, and
(iii) a solvent for said binder, into a uniformly dispersed slurry;
(b) introducing said thusly blended uniformly dispersed slurry onto a rotating internal molding surface;
(c) applying an effective centrifugal force to said slurry thusly introduced onto said rotating internal molding surface which is operable for transforming said slurry into an outer, densely packed, annular layer of said solid particles coated with a small amount of said solvent and said binder which is compressed against said molding surface by said centrifugal force and an inner annular layer of said solvent and said binder which is compressed against said outer, densely packed, annular layer of said solid particles by said centrifugal force, the amount of binder used for forming said uniformly dispersed slurry in step (a) being in excess of an amount required to bond said solid particles together;
(d) after forming said outer and inner annular layers and while applying said centrifugal force, removing said solvent from said outer and inner annular layers by evaporation;
(e) allowing said binder coating said solid particles in said outer annular layer to bond said solid particles together thereby forming an outer, densely packed, bonded, annular layer of said solid particles, and allowing said binder in said inner annular layer to cure into a solid state thereby forming an inner annular layer of cured binder;
(f) removing said applied centrifugal force from said outer and inner annular layer and thereafter separating said inner annular layer of cured binder from said outer, densely packed, bonded, annular layer of said solid particles; and
(g) separating said outer densely packed, bonded, annular layer of said solid particles from said molding surface thereby producing a tape of densely packed, bonded solid particles.

10. The method of claim 9, wherein said effective centrifugal force is at least about 1800 g.

11. The method of claim 9, further comprising sintering said thusly produced tape of sensely packed, bonded solid particles to produce a tape of sensely packed, sintered solid particles.

12. The method of claim 9, wherein said finely divided solid particles used to produce said tape of densely packed, bonded solid particles are strontium lanthanum manganite particles.

13. The method of claim 9, wherein said binder is polyvinyl butyral and said solvent is methylene chloride.

14. A mehtod of producing a multilayer tape of sensely packed, bonded solid particles comprising:
(a) blending a first mixture comprising
(i) finely divided first solid particles having a chemical composition,
(ii) a first binder operable upon curing for bonding said finely divided first solid particles together, and
(ii) a first solvent for said first binder, into an uniformly dispersed first slurry;
(b) introducing said thusly blended uniformly dispersed first slurry onto a rotating internal molding surface;
(c) applying an effective centrifugal force to said first slurry thusly introduced onto said rotating internal molding surface which is operable for transforming said first slurry into an outer, densely packed, annular layer of said, first solid particles coated with a small amount of said firt solvent and said firt binder which is compressed against said molding surface by said centrifugal force, and an inner annular layer of said first solvent and said first binder which is compressed against said outer, densely packed, annular layer of said first solid particles by said centrifugal force, the amount of said first binder used for forming said uniformly dispersed first slurry in step (a) being in excess of an amount required to bond said first solid particles together;
(d) aftr forming said outer and inner layers and while applying said centrifugal force, removing said first solvent from said outer and inner annular layers by evaporation;
(e) allowing said first binder coating said first solid particles in said outer, densely packed, annular layer to bond said first solid particles together thereby forming an outer densely packed, bonded, annular layer of said first solid particles, and allowing said first binder in said inner annular layer to cure into a solid state thereby forming an inner annular layer of cured first binder;
(f) removing said applied centrifugal force from said outer and inner annular layers and thereafter separating said inner annular layer of cured first binder from said outer, densely packed, bonded annular layer of said first solid particles;

(g) blending a second mixture comprising
  (i) finely divided second solid particles having a chemical composition which is different from said chemical composition of said first solid particles,
  (ii) a second binder operable upon curing for bonding said finely divided second solid particles together, and
  (ii) a second solvent for said second binder, into an uniformly dispersed second slurry, said second binder and said second solvent not being capable of chemically attacking said first binder in said thusly produced outer, densely packed, bonded, annular layer of said first solid particles;

(h) rotating said internal solding surface containing said outer, densely packed, bonded, annular layer of said first solid particles;

(i) introducing said thusly blended uniformly dispersed second slurry onto said rotating outer, densely packed, bonded, annular layer of said first solid particles;

(j) applying an effective centrifugal force to said second slurry thusly introduced onto said rotating outr, densely packed, bonded, annular layer of said first solid particles which is operable for transforming said second slurry into a second, densely packed, annular layer of said second solid particles coated with a small amount of said second solvent and said second binder which is compressed against said outer, densely packed, bonded, annular layer of said first solid particles by said last mentioned centrigugal force, and an inner annulr layer of said second solvent and said second binder which is compressed against said second, densely packed, annular layer of said second solid particles by said last mentioned centrifugal force, the amount of said second binder used for forming said uniformly dispersed second slurry in step (g) being in excess of an amount required to bond said second solid particles together;

(k) aftr forming said second, densely packed, annular layer of said second solid paticles and said inner annular layer of said second solvent and said second binder, removing said second solvent therefrom by evaporation;

(l) allowing said second binder coating said second solid particles in said second, densely packed, annular layer of said second solid particles to bond said second solid particles thereof together thereby forming a second, densely packed, bonded, annular layer of said second solid particles, and allowing said second binder in said last mentioned inner annular layer to cure into a solid state thereby forming an inner annular layer of cured second binder;

(m) removing said last mentioned applied centrifugal force from said annular layers and thereafter separating said inner annular layer of cured second binder from said second, densely packed, bonded, annular layer of said second solid particles thereby forming a composite layer of said second solid particles thereby forming a composite layer structure which comprises said outer, densely packed, bonded, annular layer of said first solid particles and bonded thereto said second, densely packed, bonded annular layer of said second solid particles; and (n) separating said composite layer structure from said internal molding surface thereby producing a multilayer tape of densely packed, bondedf solid particles.

15. The method of claim 14, wherein said chemical composition of said finely divided first solid particles is strontium lanthanum manganite, and said chemical composition of said finely divided second solid particles in yttria stabilized zirconia.

16. A method of producing a multilayer tape of densely packed, bonded solid particles comprising:
  (a) blending a first mixture comprising
    (i) finely divided first solid particles having a chemical composition,
    (ii) a first binder operable upon curing for bonding said finely divided first solid particles together, and
    (ii) a first solvent for said first binder, into an uniformly dispersed first slurry;
  (b) introducing said thusly blended uniformly dispersed first slurry onto a rotating internal molding surface;
  (c) applying an effective centrifugal force to said first slurry thusly introduced onto said rotating internal molding surface which is operable for transforming said first slurry into an outer, densely packed, annular layer of said, first solid particles coated with a small amount of said first solvent and said first binder which is compressed against said molding surface bvy said centrifugal force, and an inner annular layer of said first solvent and said first binder which is compressed against said outer, densely packed, annular layer of said first solid particles by said centrifugal force, the amount of said first binder used for forming said uniformly dispersed first slurry in step (a) being in excess of an amount required to bond said first solid particles together;
  (d) after forming said outer and inner layers and while applying said centrifugal force, removing said first solvent from said outer and inner annular layers by evaporation;
  (e) allowing said first binder coating said first solid particles in said outer, densely packed, annular layer to bond said first solid particles together thereby forming an outer densely packed, bonded, annular layer of said first solid particles, and allowing said first binder in said inner annular layer to cure into a solid state thereby forming an inner annular layer of cured first binder;
  (f) removing said applied centrifugal force from said outer and inner annular layers and thereafter separating said inner annular layer of cured first binder from said outer, densely packed, bonded annular layer of said first solid particles;
  (g) blending a second mixture comprising
    (i) finely divided second solid particles having a chemical composition which is different from said chemical composition of said first solid particles,
    (ii) a second binder operable upon curing for bonding said finely divided second solid particles together, and
    (iii) a second solvent for said second binder, into an uniformly dispersed second slurry, said second binder and said second solvent not being capable of chemically attacking said first binder in said thusly produced outer, densely packed, bonded, annular layer of said first solid particles;
(h) rotating said internal molding surface containing said outer, densely packed, bonded, annular layer of said first solid particles;
(i) introducing said thusly blended uniformly dispersed second slurry onto said rotating outer, densely packed, bonded, annular layer of said first solid particles;
(j) applying an effective centrifugal force to said second slurry thusly introduced onto said rotating outer, densely packed, bonded, annular layer of said first solid particles which is operable for transforming said second slurry into a second, densely packed, annular layer of said second solid particles coated withf a small amount of said second solvent and said second binder which is compressed against said outer, densely packed, bonded, annular layer of said first solid particles by said last mentioned centrifugal force, and an inner annular layer of said second solvent and said second binder which is compressed against said second, densely pakced, annular layer of said second solid particles by said last mentioned centrifugal force, the amount of said second binder used for forming said uniformly dispersed second slurry in step (g) being in excess of an amount required to bond said second solid particles together;
(k) after forming said second, densely packed, annular layer of said second solid aprticles and said inner annular layer of said second solvent and said second binder, removing said second solvent therefrom by evaporation;
(l) allowing said second binder coating said second solid particles in said second, densely packed, annular layer of said second solid particles to bond said second solid particles thereof together thereby forming a second, densely packed, bonded, annular layer of said second solid particles, and allowing said second binder in said last mentioned inner annular layer to cure into a solid state thereby forming an inner annular layer of cured second binder;
(m) removing said last mentioned applied centrifugal force from said annular layers and thereafter separating said inner annular layer of cured second binder from said second, densely packed, bonded, annular layer of said second solid particles;
(n) blending a thirs mixture comprising
 (i) finely divided third solid particles having a chemical composition which is different from said chemical composition of said second solid particles,
 (ii) a third binder operable for bonding said finely divided third solid particles together, and
 (iii) a third solvent for said third binder, into an uniformly dispersed third slurry, said third binder and said third solvent not being capable of chemically attacking said second binder in said thusly formed second, densely pakced, bonded, annular layer of said second solid particles;
(o) rotating said internal molding surface containing said outer, densely packed, bonded annular layer of said first solid particles and said second, densely packed, bonded, annular layer of said second solid particles;
(p) introducing said thusly blended uniformly dispersed third slurry onto said rotating second, densely packed, bonded, annular layer of said second solid particles;
(q) applying an effective centrifugal force to said second slurry thusly introduced onto said rotating seocnd, densely packed, bonded, annular layer of said second solid particles which is operable for transforming said third slurry into a third, densely packed, annular layer of said third solid particles coated with a small amount of said third solvent and said third binder which is compressed against said second, densely packed, bonded, annular layer of said second solid particles by said last mentioned centrifugal force, and an inner annular layer of said third solvent and said third binder which is compressed against said third, densely packed, annular layer of said third solid particles by said last mentioned centrifugal force, the amount of said third binder used for forming said uniformly dispersed third slurry in step (n) being in excess of an amount required to bond said third solid particles together;
(r) after forming said third, densely packed, annular layer of said third solid particles and said inner annular layer of said third solvent and said third binder, removing said third solvent threfrom by evaporation;
(s) allowing said third binder coating said third solid particles in said third, densely packed, annular layer of said third solid particles to bond said third solid particles thereof together thereby forming a third, densely packed, bonded, annular layer of said third solid particles, and allowing said third binder in said last mentioned inner annular layer to cure into a solid state thereby forming an inner annular layer of cured third binder;
(t) removing said last mentioned applied centrifugal force from said annular layers and thereafter separating said inner annular layer of cured third binder from said third, densely packed, bonded, annular layer of said third solid particles thereby forming a composite layer structure which comprises said outer, densely packed, bonded, annular layer, of said first solid particles which is bonded to said second, densely packed, bonded, annular layer of said second solid particles, which is bonded to said third, densely packed, bonded, annular layer of said third solid particles; and
(u) separating said composite layer structure from said internal molding surface thereby producing a multilayer tape of densely packed, bonded solid particles.

17. The method of calim 16, wherein said chemical compsotion of said finely divided first and third solid particles is strontium lanthenum manganite, and said chemical composition of said finely divided second solid particles is yttria stabilized zirconia.

18. The method of calim 17, wherein said first and third binder is polyvinyl butyral, said second binder is linseed oil, said first and third solvent is methylene chloride, and said second solvent is petroleum spirits.

19. A method of producing a multilayer tape of sensely packed, bonded solid particles comprising a layer of yttria stabilized zirconia particles sandwiched between and bonded to layers of ilament shaped fragments of bonded agglomerates of strontium lanthanum manganite particles comprising:
 (a) blending a mixture comprising (i) finely divided solid particles of strontium lanthanum manganite,
(ii) a binder operable for bonding said solid particles together, and
(iii) a solvent for said binder, into an uniformly dispersed slurry;

(b) transforming said slurry into a plurality of downwardly falling filaments;

(c) deflecting and drying said plurality of downwardly falling filaments with a plurality of impinging gas streams operative for deflecting and bending said filaments into a plurality of downwardly falling sinuous filaments while simultaneously removing said solvent therefrom by evaporation;

(d) collecting said plurality of sinuous filaments on a moving surface in such a manner that said plurality of sinuous filaments overlap each other in a predetermined amount thereby forming a mat of overlying sinuous filaments having a predetermine thickness;

(e) compressing said mat to increase the filament-to-filament contact therein thereby producing a pressed mat;

(f) sintering said pressed mat at a temperature operable for increasing the amount of filament-to-filament bonding therein thereby providing a bonded mat;

(g) comminuting said bonded mat thereby producing filament shaped fragments of bonded agglomerates of strontium lanthanum manganite particles;

(h) blending a first mixture comprising
(i) said filament shaped fragments produced in step (g),
(ii) a first binder operable upon curing for bonding said filament shaped fragments together, and
(iii) a first solvent for said first binder, into an uniformly dispersed first slurry;

(i) introducing said thusly blended uniformly dispersed first slurry onto a rotating internal molding surface;

(j) applying an effective centrifugal force to said first slurry thusly introduced onto said rotating internal molding surface which is operable for transforming said first slurry into an outer, densely packed, annular layer of said filament shaped fragments coasted with a small amount of said first solvent and said first binder which is compressed against said molding surface by said centrifugal force, and an inner annular layer of said first solvent and said first binder which is compressed against said outer, densely packed, annular layer of said filament shaped fragments by said centrifugal force, the amount of said first binder used for forming said uniformly dispersed first slurry in step (h) being in excess of an amount required to bond said filament shaped fragments together;

(k) after forming said outer and inner layers and while applying said centrifugal force, removing said first solvent from said outer and inner annular layers by evaporation;

(l) allowing said first binder coating said filament shaped fragments in said outer, densely packed, annular layer to bond said filament shaped fragments together thereby forming an outer densely packed, bonded, annular layer of said filament shaped fragments, and allowing said first binder in said inner annular layer to cure into a solid state thereby forming an inner annular layer of cured first binder;

(m) removing said applied centrifugal force from said outer and inner annular layers and thereafter separating said inner annular layer of cured first binder from said outer, densely packed, bonded annular layer of said filament shaped fragments;

(n) blending a second mixture comprising
(i) finely divided yttria stabilized zirconia particles,
(ii) a second binder operable upon curing for bonding said finely divided yttria stabilizied zirconia particles together, and
(iii) a second solvent for said second binder, into an uniformly dispersed second slurry, said second binder and said second solvent not being capable of chemically attacking said first binder in said thusly produced outer, densely packed, bonded, annular layer of said filament shaped fragments;

(o) rotating said internal molding surface containing said outer,f densely packed, bonded, annular layer of said filament shaped fragments;

(p) introducing said thusly blended uniformly dispersed second slurry onto said rotating outer, densely packed, bonded, annular layer of said filament shaped fragments;

(q) applying an effective centrifugal force to said second slurry thusly introduced onto said rotating outer, densely packed, bonded, annular layer of said filament shaped fragments which is operable for transforming said second slurry into a second, densely packed, annular layer of said yttria stabilized zirconia particles coated with a small amount of said second solvent and said second binder which is compressed against said outer, densely packed, bonded, annular layer of said filament shaped fragments by said last mentioned centrifugal force, and an inner annular layer of said second solvent and said second binder which is compressed against said second, densely packed, annular layer of said yttria stabilized zirconia particles by said last mentioned centrifugal force, the amount of said second binder used for forming said uniformly dispersed second slurry in step (n) being in excess of an amount required to bond said yttria stabilized zirconia particles together;

(r) after forming said second, densely packed, annular layer of said yttria stabilized zirconia particles and said inner annular layer of said second solvent and said second binder, removing said second solvent therefrom by evaporation;

(s) allowing said second binder coating said yttria stabilized zirconia particles in said second, densely packed, annular layer of said yttria stabilized zirconia particles to bond said yttria stabilized zirconia particles thereof together thereby forming a second, densely packed, bonded, annular layer of said yttria stabilized zirconia particles, and allowing said second binder in said last mentioned inner annular layer to cure into a solid state thereby forming an inner annular layer of cured second binder;

(t) removing said last mentioned applied centrifugal force from said annular layers and thereafter separating said inner annular layer of cured second binder from said second, densely packed, bonded, annular layer of said yttria stabilized zirconia particles;

(u) blending a third mixture comprising (i) said filament sahped fragments produced in step (g),
(ii) a third binder operable for bonding said filament shaped fragments together, and
(iii) a third solvent for said third binder, into an uniformly dispersed third slurry, said third binder and said third solvent not being capable of chemically attacking said second binder in said thusly formed second, densely packed, bonded, annular layer of said yttria stabilized zirconia particles;

(v) rotating said internal molding surface containing said outer, densely packed, bonded annular layer of said filament shaped fragments and said second, densely packed, bonded, annular layer of said yttria stabilized zirconia particles;

(w) introducing said thusly blended uniformly dispersed third slurry onto said rotating second, densely packed, bonded, annular layer of said yttria stabilized zirconia particles;

(x) applying an effective centrifugal force to said second slurry thusly introduced onto said rotating second, densely packed, bonded, annular layer of said yttria stabilized zirconia particles which is operable for transforming said third slurry into a third, densely packed, annular layer of said filament shaped fragments coated with a small amount of said third solvent and said third binder which is compressed against said second, densely packed, bonded, annular layer of said yttria stabilized zirconia particles by said last mentioned centrifugal force, and an inner annular layer of said third solvent and said third binder which si compressed against said third, densely packed, annular layer of said filament shaped fragments by said last mentioned centrifugal force, the amount of said third binder used for forming said uniformly dispersed third slurry in step (u) being in excess of an amount required to bond said filament shaped fragments together;

(y) after forming said third, densely packed, annular layer of said filament shaped fragments and said inner annular layer of said third solvent and said third binder, removing said third solvent therefrom by evaporation;

(z) allowing said third binder coating said filament shaped fragments in said third, densely packed,f annular layer of said filament shaped fragments to bond said filament shaped fragments thereof together thereby forming a third, densely packed, bonded, annular layer of said filament shaped fragments, and allowing said third binder in said last mentioned inner annular layer to cure into a solid state thereby forming an inner annular layer of cured third binder;

(aa) removing said last mentioned applied centrifugal force from said annular layers and thereafter separating said inner annular layer of cured third binder from said third, densely packed, bonded, annular layer of said filament shaped fragments thereby forming a composite layer structure which comprises said outer, densely packed, bonded, annular layer, of said filament shaped fragments which is bonded to said second, densely packed, bonded, annular layer of said yttria stabilized zirconia particles, which is bonded to said third, densely packed, bonded, annular layer of said filament shaped fragments; and (bb) separating said composite layer structure from said internal molding surface thereby producing a multilayer tape of densely packed, bonded solid particles comprising a layer of yttria stabilized zirconia particles sandwiched between and bonded to layers of filament shaped fragments of bonded agglomerates of strontium lanthanum manganite particles.

20. A mehtod of forming a mat of overlying sinuous ceramics filaments having a predetermined thickness comprising:
(a) blending a mixture comprising
(i) finely divided solid ceramic particles,
(ii) a binder operable for bonding said solid ceramic particles together, and
(iii) a solvent for said binder, into an uniformly dispersed slurry;
(b) extruding said slurry into a plurality of downwardly falling filaments having a width of at least about 0.00025 inches;
(c) deflecting said plurality of downwardly falling filaments with a plurality of impinging gas streams operative for deflecting and bending said filaments into a plurality of downwardly falling sinuous filaments while simultaneously removing said solvent therefrom by evaporation; and
(d) collecting said plurality of sinuous filaments on a moving surface in such a manner that said plurality of sinuous filaments overlap each other a predetermined amount thereby forming a mat of overlying sinuous filaments having a predetermined thickness.

21. A method of producing filament shaped fragments of bonded agglomerates of strontium lanthanum manganite particles comprising:
(a) blending a mixture comprising
(i) finely divided solid particles of strontium lanthanum manganite,
(ii) a binder operable for bonding said solid particles together, and
(iii) a solvent for said binder, into an uniformly dispersed slurry;
(b) extruding said slurry into a plurality of downwardly falling filaments;
(c) deflecting and drying said plurality of downwardly fallin gfilaments with a plurality of impinging gas streams operative for deflecting and bending said filaments into a plurality of downwardly falling sinuous filaments while simultaneously removing said solvent therefrom by evaporation;
(d) collecting said plurality of sinuous filaments on a movifng surface in such a manner that said plurality of sinuous filaments overlap each other a predetermine damount thereby forming a mat of overlying sinuous filaments having a predetermined thickness;
(e) compressing said mat to increasre the filament-to-filament contact therein thereby producing a pressed mat;
(f) sintering said pressed mat at a temperature operable for increasing the amount of filament-to-filament bonding therein thereby providing a bonded mat; and
(g) comminuting said bonded mat thereby producing filament shaped fragments of bonded agglomerates of strontium lanthanum manganite particles,
wherein said thusly produced fragments have a length of at least about 0.003 inches and a width of at least about 0.00025 inches.

* * * * *